US007178062B1

(12) United States Patent
Dice

(10) Patent No.: US 7,178,062 B1
(45) Date of Patent: Feb. 13, 2007

(54) METHODS AND APPARATUS FOR EXECUTING CODE WHILE AVOIDING INTERFERENCE

(75) Inventor: David Dice, Foxborough, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 875 days.

(21) Appl. No.: 10/386,593

(22) Filed: Mar. 12, 2003

(51) Int. Cl.
*G06F 11/00* (2006.01)

(52) U.S. Cl. .................. 714/38; 710/260; 712/244; 718/107; 718/108

(58) Field of Classification Search .................. 714/38
See application file for complete search history.

(56) References Cited

U.S. PATENT DOCUMENTS

| 4,908,750 | A |   | 3/1990 | Jablow ................. 364/200 |
| 5,274,823 | A | * | 12/1993 | Brenner et al. ............. 710/200 |
| 6,092,144 | A | * | 7/2000 | Thielen ................. 710/269 |
| 6,366,946 | B1 | * | 4/2002 | Christensen ............... 718/106 |
| 6,697,834 | B1 | * | 2/2004 | Dice ................... 718/102 |
| 6,799,236 | B1 | * | 9/2004 | Dice et al. ................. 710/200 |
| 6,862,664 | B2 | * | 3/2005 | Tremblay et al. ........... 711/137 |
| 2004/0025160 | A1 | * | 2/2004 | Dice et al. ................. 718/102 |
| 2005/0216633 | A1 | * | 9/2005 | Cavallo ................. 710/260 |
| 2005/0262301 | A1 | * | 11/2005 | Jacobson et al. ........... 711/118 |

OTHER PUBLICATIONS

Brian N. Bershad, David D. Redell and John R. Ellis, Fast Mutual Exclusion for Uniprocessors, ASPLOS V—Oct. 1992/MA, USA.

* cited by examiner

*Primary Examiner*—Robert Beausoliel
*Assistant Examiner*—Philip Guyton
(74) *Attorney, Agent, or Firm*—Chapin IP Law, LLC; Barry W. Chapin, Esq.

(57) ABSTRACT

Mechanisms and techniques operate in a scalable or non-scalable processing architecture computerized device to execute critical code while overcoming interference from interruptions. A critical signal handler is registered and a non-operating system thread sets a value of a critical code register to indicate a critical execution condition. The non-operating system thread then executes a critical code section until an interruption occurs. In response to the interruption to the critical code section, an operating system thread detects if the critical code register is equivalent to a critical execution condition and if so, sets the value of the critical code register to indicate a critical execution failure. Upon returning to execution of the critical code section, the critical code section attempts to execute a contingent instruction in the critical code section that is contingent upon the value of the critical code register. The attempted execution of the contingent instruction triggers a critical trap signal when the critical code register is set to a value that indicates the critical execution failure. The critical execution signal handler processes the critical trap signal to avoid any interference that may have been caused by the interruption.

26 Claims, 6 Drawing Sheets

228
ATTEMPT TO EXECUTE A CONTINGENT INSTRUCTION IN THE CRITICAL CODE SECTION THAT IS CONTINGENT UPON THE VALUE OF THE CRITICAL CODE REGISTER, THE ATTEMPTED EXECUTION OF THE CONTINGENT INSTRUCTION TRIGGERING A CRITICAL TRAP SIGNAL WHEN THE CRITICAL CODE REGISTER IS SET TO A VALUE THAT INDICATES CRITICAL EXECUTION FAILURE (E.G., UPON RETURNING TO EXECUTION OF THE CRITICAL CODE SECTION WITHIN THE NON-OPERATING SYSTEM THREAD WHILE THE CRITICAL CODE REGISTER CONTAINS A VALUE REPRESENTING THE CRITICAL FAILURE CONDITION)

228-1
SCALEABLE PROCESSOR ARCHITECTURE:
ATTEMPT TO EXECUTE A SCALEABLE PROCESSOR ARCHITECTURE BASED CONTINGENT INSTRUCTION WITHIN A NON-OPERATING SYSTEM THREAD THAT REQUIRES, FOR SUCCESSFUL EXECUTION, THAT AN ADDRESS SPACE IDENTIFICATION REGISTER OPERATING AS THE CRITICAL CODE REGISTER BE SET TO AT LEAST ONE VALID NON-OPERATING SYSTEM THREAD ADDRESS SPACE IDENTIFICATION VALUE THAT IS NOT EQUAL TO A VALUE REPRESENTING THE CRITICAL EXECUTION FAILURE

OR

228-2
NON-SCALABLE PROCESSOR ARCHITECTURE:
ATTEMPT TO EXECUTE A NON-SCALABLE PROCESSOR ARCHITECTURE BASED CONTINGENT INSTRUCTION WITHIN A NON-OPERATING SYSTEM THREAD THAT REQUIRES, FOR SUCCESSFUL EXECUTION, THAT THE CRITICAL CODE REGISTER CONTAINS A DATA SEGMENT SELECTOR VALUE THAT IS NOT EQUAL TO A VALUE REPRESENTING THE CRITICAL EXECUTION FAILURE

FIG. 6

229
PROCESS THE CRITICAL TRAP SIGNAL TO AVOID INTERFERENCE FROM THE INTERRUPTION TO THE CRITICAL CODE SECTION

229-1
INVOKE OPERATION OF THE CRITICAL EXECUTION SIGNAL HANDLER TO PROCESS THE CRITICAL CODE SECTION TO DETECT AND OVERCOME ANY INTERFERENCE CAUSED BY THE INTERRUPTION TO CRITICAL CODE SECTION

229-2
OPERATE A CRITICAL CODE SECTION RESET PROCEDURE THAT RESETS INFORMATION ASSOCIATED WITH THE CRITICAL CODE SECTION TO A SET OF INITIAL VALUES AND RESTARTS EXECUTION OF THE CRITICAL CODE SECTION FROM A BEGINNING OF THE CRITICAL CODE SECTION

OR

229-3
OPERATE A CRITICAL CODE SECTION ROLLBACK PROCEDURE THAT RESETS INFORMATION ASSOCIATED WITH THE CRITICAL CODE SECTION TO A STATE THAT EXISTED JUST PRIOR TO THE INTERRUPTION AND RESTARTS THE EXECUTION OF THE CRITICAL CODE SECTION FROM A POINT OF INTERRUPTION TO THE CRITICAL CODE SECTION

OR

229-4
OPERATE A CRITICAL CODE SECTION CONTINUATION PROCEDURE THAT CONFIRMS THE INTERRUPTION TO THE CRITICAL CODE SECTION DID NOT ADVERSELY EFFECT INFORMATION ASSOCIATED WITH THE CRITICAL CODE SECTION AND ALLOWS EXECUTION OF THE CRITICAL CODE SECTION TO CONTINUE FROM THE POINT OF INTERRUPTION TO THE CRITICAL CODE SECTION

FIG. 7

METHODS AND APPARATUS FOR EXECUTING CODE WHILE AVOIDING INTERFERENCE

FIELD OF THE INVENTION

The present invention generally relates to systems for atomically executing a series of instructions in a computerized device without interference from interruptions.

BACKGROUND OF THE INVENTION

Conventional computer systems and computerized devices include one or more central processing units (CPUs) or processors that can operate (e.g., execute) software programs that are encoded as a series of logic instructions within a memory system accessible to the processor(s). Such computer systems also typically include an operating system program encoded within the memory system. The operating system operates as a control program that controls or schedules when the processor(s) is/are able to execute the entire collection of programs that are waiting to operate, such as user processes, operating systems processes and the like. Multitasking operating systems allow a single processor within a conventional computer system to execute multiple processes or threads in a back-to-back or time-sliced manner such that each process is able to move forward and make progress in its execution by utilizing a portion or "slice" of processor cycles for execution. The terms process and thread will be used throughout this description interchangeably to denote a related set of logic instructions in a program or process that a processor can perform (e.g., execute, interpret, run, etc.).

Some conventional computer systems include multiple processors that can operate under the control of a multiprocessing operating system. Such a multiprocessing operating system controls the execution of multiple processes across the range of available processors in the computerized device. Most common multiprocessor computer systems operate as "symmetric" multiprocessors (SMP) where all memory in the computer system is shared and any processor may have access to any portion of memory. In other words, all processors have a symmetric "view" of physical memory. As an example of a multiprocessing computer system in operation, an operating system may begin to execute a user process on a first processor for a period of time until an interrupt of some sort occurs to that user process. Perhaps the interrupt is caused when the processor executes an instruction in the user process that requires that user process to access to data stored within a disk drive or other storage device coupled to the computer system. As a result of such an input/output (I/O) request, the operating system in that computer system suspends execution of the user process on the first processor while other software (e.g., an I/O process) and/or circuitry within the computer system handles any required processing associated with the I/O interrupt. When the operating system later detects that handling of the interrupt is complete or finished and the requested data is now available for the user process, the operating system then reschedules execution of the user process on the same processor, or possibly on a second, third or other processor since the first processor may have already been rescheduled and may be currently executing another process. In this manner, multiprocessing operating system can "migrate" execution of processes from one processor to another to achieve greater overall processing throughput and while one process is waiting for completion of an interrupt (e.g., to obtain data from a disk), the operating system can de-schedule this process (i.e., block the process in a wait state until completion of the interrupt) and can schedule another process to operate on the processor in place of the blocked process so as to optimally utilize processing cycles of that processor.

Certain software programs that execute as processes within conventional computer systems sometimes include a requirement that portions of software code within the process be executed in an "atomic" or uninterrupted manner. These portions of code in such a process or program are often referred to as "critical code," "critical code sections" or "atomic" code. Generally, critical or atomic code is a series of one or more software or other logic instructions associated with a process, thread or program, such as microcode, machine language instructions, or even high-level language instructions (e.g., a series of C or Java code statements), that a processor in the computer system must ensure to execute from start to finish without any interference from interruptions. Typical sources of interference are interruptions and actions performed by other processes such as remote actions. A common example of interference would be multiple threads writing to shared memory variables. Interference may also occur when a thread issues an instruction that generates an interrupt that the operating system must handle, such as by issuing a system call to obtain data form a storage device in the computer system. To handle this type of call, the operating system must access the storage device, obtaining the request data, and returning the data back to the process that made this system call. In relative terms, such a system call might take a large amount of processing time since the storage device is comparatively slow to access data in relation to the number of instructions that the processor may perform in the same amount of time. Accordingly, during such the time the storage device is obtaining the requested data, the operating system may cause the processor to operate (e.g., execute) another process. This other process that executes in the meantime (i.e., while the process that issued the system call causing the interrupt waits for completion of the access to the requested data in the storage device) may modify data associated or shared with the other process, thus causing interference.

A common example of interference would be multiple threads writing to shared memory variables. Another common type of interference is a "clock" interrupt used by an operating system's (e.g., kernel's) scheduler to implement preemptive multitasking. When the scheduler activates a thread, the scheduler programs a hardware clock in the processor to expire at the end of that thread quantum (i.e., a time period assigned to that thread for execution). When the quantum expires, the clock generates a hardware interrupt causing the scheduler to gain control. The scheduler then switches to another thread for execution. Such interference or preemption is sometimes referred to as an involuntary context switch. During operation of other thread during their respective quantums, they may modify memory locations of previously execution thread thus causing preemptive interference. Another source of interference is thread migration, where kernel executing a thread on one CPU migrates (e.g., for load balancing purposes) the thread to execute on another CPU. Interference is thus generally defined as an external modification or change made (i.e., by code other than the critical code or the process containing the critical code) to data, memory contents, register contents, flags, or other information that is related to (e.g., referenced by) the critical code.

There are a number of reasons why a process may contain a series of instructions (i.e., critical code) that must be executed atomically (i.e., without interference). As an example, some conventional computer systems include memory systems that operate as shared memory. Shared memory may be, for example, a section of main memory that allows two or more software processes to access the same set of memory locations during their execution. Processes can use shared memory for such functions as interprocess communication, process synchronization and for other reasons. When a process contains a series of instructions that operate on shared memory locations, it is often preferable to execute those instructions atomically as critical code in order to ensure that the content of the shared memory is accurately maintained (i.e., to ensure that no other process or program could have manipulated the shared memory accessed by the critical code during its atomic operation). If a conventional operating system interrupts a sequence of critical code instructions that access the shared memory before the critical code sequence completes full execution (i.e., before the sequence completes execution from start to end), the state or contents of the shared memory might be unreliable upon return to execution of the critical code at the point of interruption since other processes or code that may have executed during the interruption may have caused interference to the shared memory. This is one example of interference caused by an interruption.

Software and computer system developers have created a number of conventional techniques to allow a sequence of critical code instructions in a process to execute in an atomic manner to ensure that interference caused by interruptions is avoided. One such conventional technique is an atomic instruction used within software code called a "compare and swap" (CAS) instruction. Generally, a CAS instruction provides a technique for depositing a value into a memory location while guaranteeing that processing leading up to the CAS instruction is not interrupted.

In operation, prior to execution of the CAS instruction, a processor executes a load instruction to fetch a value from a known memory location M. This memory location M is typically the target memory location to which data must be written to in an atomic manner (i.e., without interference). Then, a processor executes one or more critical code instructions in the process or thread to perform any required critical code processing. Finally, the processor executes the CAS instruction typically as the last instruction at the end of the critical section of code. The CAS instruction receives a set of parameters including an old value, a new value, and an address of the memory location M. The CAS instruction obtains ownership of the shared memory or cache at the location M specified by the address parameter and then obtains the value of data stored at this location. The CAS instruction then compares the value obtained from location M with the old value parameter provided to the CAS instruction. If the old value (i.e., the parameter) equals the value obtained from the location of the address M (i.e., the value fetched at the beginning of the critical code section), then the CAS instruction can assume that no interference has taken place to this memory location and the CAS instruction proceeds to store the new value at that location M. The CAS instruction also returns the new value as output. In the alternative, if the old value parameter does not equal the value that the CAS instruction retrieves from the location of the address M, then the CAS instruction can infer that some processing has disturbed or caused interference to the original value at the memory location M. In such cases, the CAS instruction does not write to memory, but does return the value fetched from location M. Upon such an indication, the processor can re-execute the critical code by jumping to the start of the critical code (i.e., by jumping back to the initial store instruction) to make another attempt to execute the critical code from start to end without interference.

A typical conventional process uses the CAS instruction at the end of critical code to form a loop that continually attempts to successfully execute the critical code ending with the CAS instruction each time this instruction fails. In this manner, a process operating the CAS instruction will not continue execution beyond the critical code section until the CAS instruction is successfully completed one time, thus guaranteeing that the thread has completely performed all of the critical code and the new value is placed into the memory location specified by the address parameter without interference from any interruptions that may have occurred during execution of all critical code preceding the CAS instruction (beginning with the original or old value being loaded from the memory location that the CAS instruction eventually checks).

An example of the CAS instruction is shown in the following code segment:

```
RETRY:
    LD M → TMP;
    . . .
    TMP+1 → TMP2;      (interruption causing interference
                        might occur here)
    CAS M,TMP,TMP2;
    IF TMP != TMP2 GOTO RETRY;
```

As shown in the example CAS above, a processor executes the LD instruction to load the contents of memory location M into the TMP variable. Next, a sequence of one or more instructions (shown by the " . . . ") are executed to manipulate the fetched copy or version of the data. In this example the variable TMP2 is set to the value of TMP+1. During this processing, an interruption causing interference might occur thus causing a change to the memory location M by some process other than the instruction TMP+1→TMP2. After processing all instructions that require atomic execution has been completed, the CAS instruction stores the contents of TMP2 into memory location M if and only if TMP and M are the same. After the CAS instruction, a test is done to check to determine if TMP and TMP2 are the same. If they are, the CAS instruction executed successfully and atomically. If not, then this processing repeats until the CAS instruction is successfully completed. The CAS instruction might fail, for instance, if another processor operates a process which accesses data at the memory location M thus causing interference, or if an interrupt occurred between the LD and the CAS, and another thread executed on the processor in the interim, that thread may have modified location M, rendering the values in TMP and TMP2 registers "stale" (i.e., out of date with respect to memory).

Another conventional technique that provides for atomic execution of critical code sections is called a "load linked store conditional" or LL/SC technique. Generally, the load linked store conditional technique involves the use of two processor instructions: a load linked (LL) instruction followed by a store conditional (SC) instruction. The two instructions operate much like conventional load and store instructions except that the LL instruction, in addition to doing a simple load, has a side effect of setting a user transparent bit called a load link bit. The load link bit forms a "breakable link" between the LL instruction and a subsequently executed SC instruction. The SC instruction performs a simple store to memory if and only if the load link bit is set when the SC instruction is executed. If the load link bit is not set, then the store will fail to execute. The success or failure of the SC instruction is indicated in a register after the execution of the SC instruction. For example, the processor may load such a register with a "1" in case of a successful store or may load the register with a "0" if the store was unsuccessful due to the load link bit being reset. The load link bit may be reset by hardware or software (i.e., changed from the state induced from the original LL instruction) upon occurrence of events that have the potential to modify the memory location from which the LL originally loaded data, and that occur during execution of the sequence of code between the LL instruction and the SC. In other words, a section of critical code that must be executed atomically can be inserted between the LL and SC instructions and the SC instruction will only store data to a specified memory location (i.e., the data being modified by the atomic code instructions) if the load link bit is not reset.

An example of where a link can be broken between an LL and SC instruction on a multiprocessor system is when an "invalidate" occurs to a cache line of shared memory which is the subject of the LL. In other words, the link might be broken between the LL and the SC instructions if the processor that executes the LL observes an external update to the cache line, or if an intervention of snoop operation invalidates the line associated with the bit. The link may also be broken by the completion of a return from an exception (i.e., interrupt). It may be the case, for example, that an interrupt to the critical code occurs after execution of the LL instruction but before the SC instruction. During the interrupt, some other thread may have successfully completed a store operation to that same shared data which causes the load link bit to be reset. To avoid interference, the software or hardware will explicitly break the link when returning from the operating system back into the interrupted critical code. This will result in the subsequent SC failing.

Typically, on SMP systems, the kernel of the operating system saves the LL address in a hidden register. That address is "snooped" by the cache coherence subsystem in normal operation. A CPU can detect external modifications to the LL address by monitoring (snooping) bus transactions and checking those addresses against the contents of the LL address register. The cache coherence protocol normally snoops in this manner to maintain coherency, so snooping the LL address is effectively "free" (it imposes no additional burden beyond normal coherence snooping). Each CPU has a private LL address register. If a CPU observes an external write to the address contained in its LL address register it "breaks the link" so the subsequent SC instruction will fail.

An example of pseudocode that illustrates the use of the load linked store conditional technique is as follows (with the text in parenthesis indicating the nature of the processing performed):

```
RETRY:
    LL M → TMP;          (load link bit set)
    TMP+1 → TMP2;        (interruption causing interference and
                          resetting the load link bit
                          might occur here)
    SC TMP2, M;          (only store if load link bit still set)
    IF FAILED_BIT = 1 GOTO RETRY;
```

As shown in the example above, the processor executes the LL instruction that operates to load the contents of memory location M into the TMP variable. The LL instruction further sets the load link bit. Next, a sequence of one or more instructions are executed to manipulate data. In this example the variable TMP2 is set to the value of TMP+1. During this processing, an interruption causing interference might occur that causes the load link bit to be reset (i.e., during the interruption). After processing all instructions that require atomic execution is complete, the SC instruction stores the contents of TMP2 into memory location M if and only if load link bit set by the LL instruction is still set (i.e., is not reset). After the SC instruction, a test is done to check a failure bit (FAILED_BIT) in a processor status register associated with the processor executing this critical code to determine if the SC instruction executed successfully. If the FAILED_BIT equals 1, processing returns to the RETRY location in order to again attempt to execute this section of critical code. This processing repeats until the SC is successfully completed. The SC instruction might fail, for instance, if another processor operates a process which accesses data at the memory location M, thus causing the load link bit to be reset (i.e., thus causing interference).

It is noted that the CAS and LL/SC mechanisms are optimistic in that they are written so that they assume the critical code transactions will complete. Such mechanisms thus check for interference at a commit point towards or at the end of the critical code.

Another conventional technique used to ensure atomic execution of critical code instructions is referred to as a lock/unlock mutual exclusion technique. The lock/unlock technique can be used, for example, in situations where a portion of shared user level code must be executed atomically. When a user level process enters a section of shared critical code, the first instruction that is executed is a lock directive that attempts to gain ownership of and set a flag indicating a user level process is in the process of executing this section of critical code. When the user level process succeeds in owning and setting this flag, the process can then execute the remainder of the critical code with or without interruption(s). When the process has completed execution of the critical code instructions, the final instruction the process executes to complete the critical code is an unlock instruction which clears the lock flag thus allowing another user level process to gain ownership of the lock flag and to execute this section of shared critical code. No process is allowed to execute this section of shared critical code until it owns the lock flag. Only one thread may hold the lock and proceed into the critical section at any one time. The kernel excludes or "blocks" other threads from the critical code. If a user level process is interrupted during execution of a critical section of code, that user level process continues to "own" the lock on that section of code and other user level processes (as well as the interrupted process) are blocked from executing that section of code until the interrupt has been handled and processing returns to complete execution of the shared critical code by the user level process that owns the lock on the critical code. That process then completes execution of that section of critical code after the interrupt and performs the unlock instruction to free that critical section of code for ownership and execution by another user level process. Since no other processes could execute the critical code section during the interrupt, it is assumed that interference did not occur.

SUMMARY OF THE INVENTION

Conventional techniques for ensuring the correct atomic operation of critical code in a conventional computer system without interference (due to interruptions, the action of other processors, or other causes) suffer from a variety of deficiencies. In particular, conventional critical section execution techniques such as compare and swap and load linked store conditional perform testing at the end of a section of critical code to determine if an interruption causing interference occurred sometime during execution of the critical code. If the critical code section contains many instructions (i.e., is lengthy), then an interruption or remote action that causes interference to the critical code near the start may not be detected until the end of the complete execution of the critical code section at which point the compare and swap or load linked store conditional are performed. In other words, such techniques may involve the processing of unnecessary critical code instructions prior to the detection of the interference and then subsequent re-execution of the critical code section from the beginning. Any critical code instructions which are executed after the occurrence of the interruption causing interference but prior to the operation of the compare and swap or load linked store conditional instruction are simply overhead instructions which consume valuable processing cycles.

In addition, optimistic techniques such as compare and swap and load linked store conditional cause re-execution of the critical code from a point that corresponds to the beginning of the critical code section. Accordingly, during execution of a critical code section containing numerous instructions, an interruption that causes interference that occurs towards the end of the execution of such instructions (i.e., thus many critical code instructions were executed prior to the interference from interruption) requires that all critical code instructions be re-executed again, even though some of such critical code instructions were properly executed the first time without interference.

Further still, conventional critical code execution techniques that attempt to guarantee atomic execution of the critical code provide no ability to detect interference immediately upon return from an interruption. Accordingly, the drawbacks mentioned above of unnecessarily executing critical code instructions prior to detecting interference cause unnecessary processor overhead.

The lock/unlock technique for ensuring atomic execution of critical code introduces another problem called the "convoy" problem. In the lock/unlock technique, once a first user process obtains ownership and sets the lock flag and begins execution of a critical code section, other user processes are unable to enter the critical code section and remain blocked until completion of the critical code section by the first user process. This can be problematic since the first user process might be interrupted for a prolonged period of time during execution of the critical code. Such an interrupt, whether or not causing interference, can impose a significant delay on the execution of the first user process as well as the other user processes that are blocked from entering the critical code section due to their inability to obtain ownership of the lock flag. In other words, the interruption delay imposed on the first user process is further imposed on other user processes that remain blocked while awaiting ownership of the critical code. Accordingly, those other user processes are "convoyed" until the first user process interruption is complete and the first user process completes execution of the critical code section and unlocks the lock flag.

In addition, lock/unlock techniques can also suffer from a problem known as the priority inversion effect. In such situations, a low priority process might obtain a lock on a portion of critical code. This low priority process might then be preempted by the operating system for a higher priority process. During execution, the higher priority process might require access to the critical code, but cannot do so due to the lock on this code still existing from the lower priority process. In such cases, the lower priority process, due to the lock, impedes the higher priority process.

These and other constraints of conventional techniques for atomically executing critical code sections can significantly increase the amount of processing time spent by a process in an attempt to atomically (i.e., fully, without interruption) execute a critical code section while avoiding the effects of interference caused by interruptions.

Embodiments of the invention provide mechanisms and techniques to execute critical code in an atomic manner while avoiding interference that may be caused by interruptions to execution of the critical code. Generally, embodiments of the invention utilize a certain class of microprocessor instructions referred to herein as "contingent instructions" that exist within the instruction sets of certain scalable and non-scalable microprocessor architectures such as Intel-based microprocessors (e.g., Pentium-based processor architectures) manufactured by Intel Corp. and Scalable Processor Architectures (SPARC) microprocessors manufactured by Sun Microsystems, Inc. SPARC is a trademark of Sun Microsystems, Inc. of Palo Alto, Calif., USA. In order to properly execute a contingent instruction within a non-operating system thread such as a user thread, the contingent instruction requires that a memory location (a register in one embodiment) referred to herein as a "critical code register" contains one or more acceptable values in a predetermined range. If the critical code register contains a value that is not within the acceptable range for execution of the contingent instruction within the non-operating system thread (i.e., within a user thread), the contingent instruction does not execute but instead causes or triggers a critical trap signal that is handled by a critical execution signal handler. Techniques employed by embodiments of the invention are useful for preventing interference on CPU-specific data.

By non-operating system thread, what is meant is a thread that is operating in user mode. Normally when a thread is executing, a trap or interrupt causes the thread to enter the kernel. Note that it is still the same thread, but it is now executing in kernel-mode instead of user-mode. Kernel-mode is a "supervisor" or "privileged" state. As used herein then, the term "non-operating system thread" also means, for example, a user-thread that has been interrupted and that has associated interrupted user-mode thread state and associated user-mode register values.

During normal execution of a non-operating system thread (e.g., a user thread), the normal or default value for the critical code register is automatically set by the operating system to an acceptable or default value such that contingent instructions are able to properly execute without causing a critical trap signal. Prior to execution of a critical code section in the non-operating system thread, embodiments of the invention modify the default value of the critical code register to a secondary value referred to herein as a critical execution condition value. Embodiments select the critical execution condition value to a value that is different than the default value, but that is still within an acceptable range for contingent instructions to properly execute. Accordingly, contingent instructions that execute while the critical code register is set to the critical execution condition value will not cause a critical trap signal to be generated.

After establishing the critical execution condition value within the critical code register, execution of the critical code section can proceed within the non-operating system thread. If an interruption occurs to the critical code section at any point in time, an operating system or kernel thread handles the interruption to the non-operating system thread in conventional manner. However, prior to returning to execution of the interrupted non-operating system thread (i.e., before returning to execution of the user thread) at the critical code section interruption point, the operating system operates a critical execution manager provided by embodiments of the invention.

The critical execution manager performs a check to detect or determine if the value of the critical code register associated with that non-operating system thread (i.e., the thread to which execution is returning) is set to the critical execution condition value. This will be the case if the interruption occurred during operation of the critical code section. If the critical execution manager determines that the critical code register is equivalent to the critical execution condition, the critical execution manager sets the value of the critical code register to indicate a critical execution failure value. The critical execution failure value is within a range that causes contingent instructions in the non-operating system thread to trap prior to the completion of their execution. In other words, the critical code manager integrated into the operating system of embodiments of the invention recognizes that the interruption occurred during operation of the critical code section based upon the critical execution condition value within the critical execution register. In response, the critical execution manager overrides (i.e., overwrites) the critical execution condition value within the critical code register with a critical execution failure value that will cause any subsequently executed contingent instructions to produce a critical trap signal. Thereafter, the critical execution manager allows processing to return to the non-operating system thread at the point of interruption to the critical code section.

Upon returning to the non-operating system thread, the non-operating system thread continues to execute the critical code section beginning at the point of interruption. Later in the critical code section, and typically at the end of the critical code section, embodiments of the invention provide that the critical code section include an attempt to execute at least one contingent instruction prior to completion. Upon attempting to execute, if an interruption had previously occurred in the critical code section, the contingent instruction in the critical code section triggers or causes a critical trap signal to occur since the setting of the critical code register indicates a critical execution failure value which is out of the range of acceptable values for the contingent instruction. Accordingly, the contingent instruction execution does not complete but instead produces a critical trap signal that invokes the critical execution signal handler to process the critical trap signal in order to avoid, overcome, recover from or compensate for any potential interference that may have occurred from the interruption to the critical code section.

The critical execution signal handler can perform a variety of different corrective actions to either correct for interference, for example, by restarting the critical code section from the beginning (i.e., performing a reset procedure), or by performing a rollback procedure the reset information associated with the critical code section to a state that existed just prior to the interruption, or by performing a continuation procedure that confirms that the interruption to the critical code did not adversely affect or otherwise modify information associated with the critical code and thus allows execution of the critical code to continue from the point of interruption. Further details of embodiments of the invention will not now be discussed with respect to the detailed description of the figures.

Embodiments of the invention can be implemented as methods in a process or as circuitry or hardware or as software or a combination of hardware and software within a computerized device or as software encoded within a computer readable medium. In particular, other embodiments of the invention include a computerized device such as a computer system, workstation, handheld or laptop computer, or other device configured with software and/or circuitry to process all of the method operations disclosed herein as embodiments of the invention. In such embodiments, the computerized device is capable of executing critical code without interference and includes a processor and a memory encoded with an operating system, a critical code section, a critical execution signal handler and a critical execution manager (that may be integrated into the operating system, for example, as a kernel thread). An interconnection mechanism couples the processor and the memory and the processor executes critical code, the critical execution manager and the operating system including the critical execution manager causing the processor to perform the operations of embodiments of the invention as explained herein. In other words, a computerized device such as a computer that is programmed to operate as explained herein is considered an embodiment of the invention.

The computerized device may also be a microprocessor or central processing unit (CPU) such as a scalable processor such as, for example, a SPARC-based microprocessor manufactured, for example by Sun Microsystems of Palo Alto, Calif., USA. Alternately, the computerized device may be a non-scalable processor such as an Intel-based Pentium or Itanium processor manufactured by Intel Corporation. As used herein, the term non-scalable refers to any other process other than a SPARC type processor, and thus includes the entire line of Intel-based processors such as the 32-bit Intel line of Pentium or other IA32 (Intel Architecture 32 bit) processors. Other processing architectures may utilize the invention as well. If the computerized device is a scalable or non-scalable processor, the memory may be an on-board cache memory and the processor portion may be an arithmetic or logic unit (ALU) or other computational circuitry within the computerized device that can execute or otherwise perform logic instructions within the memory.

Other arrangements of embodiments of the invention that are disclosed herein include software programs to perform the method embodiment steps and operations summarized above and disclosed in detail below. As an example, an operating system configured with a critical execution manager that operates as explained herein is considered an embodiment of the invention. Alternatively, the critical execution manager may be implemented in a user process, or partly in an operating system and partly in one or more user space processes, or in any combination thereof. More particularly, a computer program product is disclosed which has a computer-readable medium including computer program logic encoded thereon that, when executed on at least one processor with a computing system or computerized device, causes the processor to perform the operations (e.g., the methods and steps) disclosed herein as embodiments of the invention. Such arrangements of the invention are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computer system to cause the computer system to perform the techniques explained herein as embodiments of the invention.

It is to be understood that the system of the invention can be embodied strictly as a software program, as software and hardware, or as hardware alone or as a single device such as a microprocessor or microchip. Example embodiments of the invention may be implemented within computer systems, computer program products, microprocessors, operating systems and/or other software applications manufactured by Sun Microsystems of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

FIGS. 3 through 7 are flow charts of processing steps that illustrate details of processing performed according to one embodiment of the invention to avoid interference caused by interruptions that occur during execution of a critical code section.

DETAILED DESCRIPTION OF EMBODIMENTS

Figure 1:
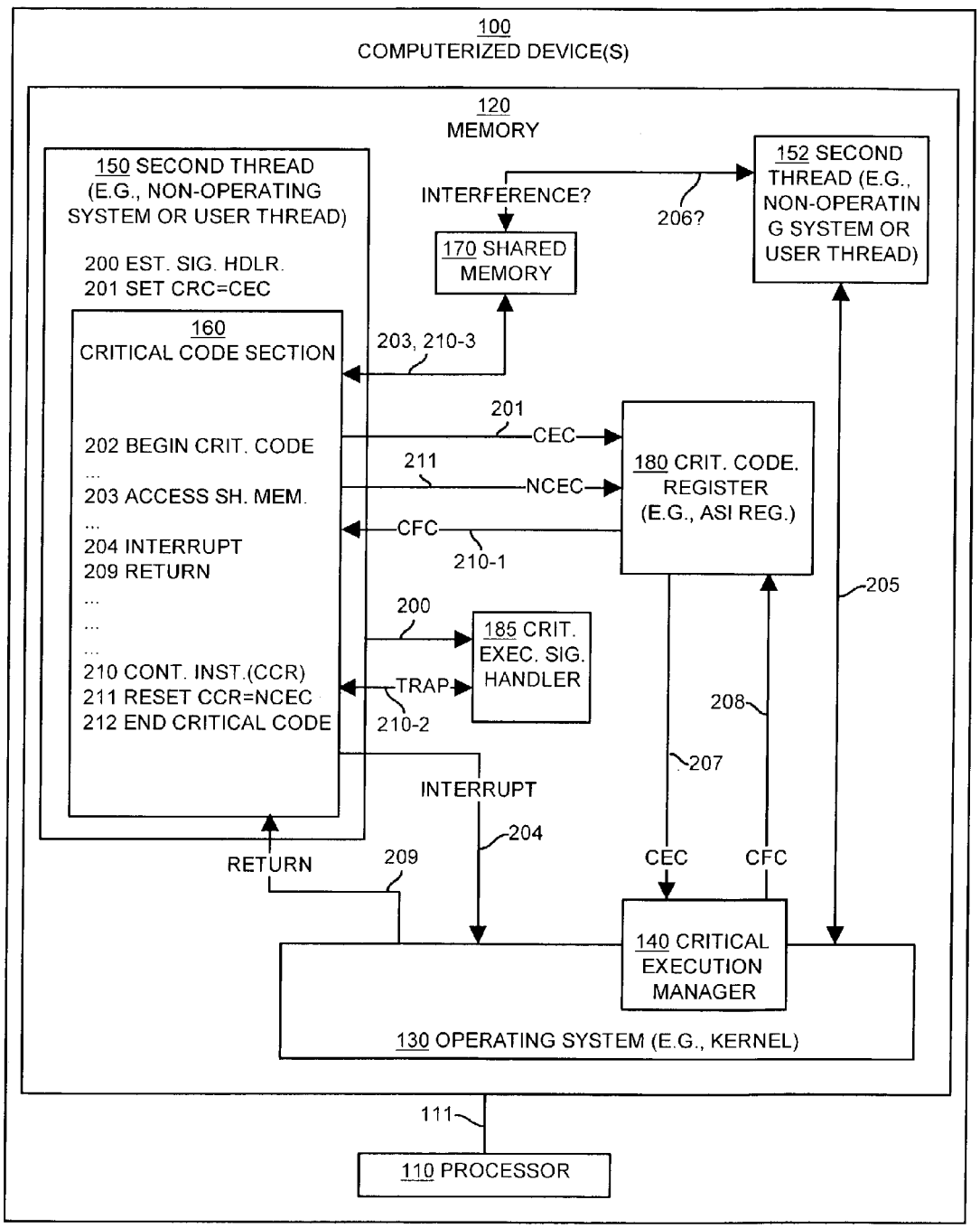
FIG. 1 illustrates an example of a computerized device that executes a thread containing critical code and that is equipped with a critical execution manager configured according to one embodiment of the invention.

Embodiments of the invention provide mechanisms and techniques to execute critical code in an atomic manner while avoiding interference that may be caused by interruptions to execution of the critical code. Generally, embodiments of the invention utilize a certain class of microprocessor instructions referred to herein as "contingent instructions" that exist within the instruction sets of certain microprocessor architectures such as Intel-based microprocessors (e.g., Pentium-based processor architectures) manufactured by Intel Corp. and Scalable Processor Architectures (SPARC) microprocessors manufactured by Sun Microsystems, Inc. In order to properly execute a contingent instruction within a non-operating system thread such as a user thread, the contingent instruction requires that a memory location referred to herein as a "critical code register" contains one or more acceptable values in a predetermined range. If the critical code register contains a value that is not within the acceptable range for execution of the contingent instruction within the non-operating system thread (i.e., within a user thread), the contingent instruction does not execute but instead causes or triggers a critical trap signal that is handled by a critical execution signal handler.

During normal execution of a non-operating system thread (e.g., a user thread), the normal or default value for the critical code register is automatically set by the operating system to an acceptable or default value such that contingent instructions are able to properly execute without causing a critical trap signal. Prior to execution of a critical code section in the non-operating system thread, embodiments of the invention modify the default value of the critical code register to a secondary value referred to herein as a critical execution condition value. Embodiments select the critical execution condition value to a value that is different than the default value, but that is still within an acceptable range for contingent instructions to properly execute. Accordingly, contingent instructions that execute while the critical code register is set to the critical execution condition value will not cause a critical trap signal to be generated.

After establishing the critical execution condition value within the critical code register, execution of the critical code section can proceed within the non-operating system thread. If an interruption occurs to the critical code section at any point in time, an operating system or kernel thread handles the interruption to the non-operating system thread in conventional manner. However, prior to returning to execution of the interrupted thread (i.e., before returning to execution of the user thread) at the critical code section interruption point, the operating system operates a critical execution manager provided by embodiments of the invention. The critical execution manager performs a check to detect or determine if the value of the critical code register associated with that non-operating system thread (i.e., the thread to which execution is returning) is set to the critical execution condition value. This will be the case if the interruption occurred during operation of the critical code section. If the critical execution manager determines that the critical code register is equivalent to the critical execution condition, the critical execution manager sets the value of the critical code register to indicate a critical execution failure value. The critical execution failure value is within a range that causes contingent instructions in the non-operating system thread to trap prior to the completion of their execution. In other words, the critical code manager integrated into the operating system in one embodiment of the invention recognizes that the interruption occurred during operation of the critical code section based upon the critical execution condition value within the critical execution register. In response, the critical execution manager overrides the critical execution condition value within the critical execution register with a critical execution failure value that will cause any subsequently executed contingent instructions to produce a critical trap signal. Thereafter, the critical execution manager allows processing to return to the non-operating system thread at the point of interruption.

Upon returning to the non-operating system thread, the non-operating system thread continues to execute the critical code section beginning at the point of interruption. Later in the critical code section, and typically at the end of the critical code section, embodiments of the invention provide that the critical code section includes at least one contingent instruction prior to completion. Upon attempting to execute, the contingent instruction in the critical code section triggers or causes a critical trap signal to occur since the setting of the critical code register indicates a critical execution failure value which is out of the range of acceptable values for the contingent instruction. Accordingly, the contingent instruction execution does not complete but instead produces a critical trap signal that invokes the critical execution signal handler to process the critical trap signal in order to avoid, overcome or remove any potential interference that may have occurred from the interruption to the critical code section.

The critical execution signal handler can perform a variety of different corrective actions to either correct for interference, for example, by restarting the critical code section from the beginning (i.e., performing a reset procedure), or by performing a rollback procedure the reset information associated with the critical code section to a state that existed just prior to the interruption, or by performing a continuation procedure that confirms that the interruption to the critical code did not adversely affect or otherwise modify information associated with the critical code and thus allows execution of the critical code to continue from the point of interruption. Further details of embodiments of the invention will not now be discussed with respect to the detailed description of the figures.

Embodiments of the invention provide significant advantages over other techniques for handling interference conditions that may occur during execution of critical code in a user or other non-operating system thread. In particular, embodiments of the present invention require minimal kernel or operating system modifications. Addition of a check of a critical code register value and setting this value to a critical execution failure value are al that are required in the kernel to provide the benefits of embodiments of the invention. In addition, as compared to other methods for handling interference in a critical code section, the present invention is easier to implement and provide for minimal performance impact on the kernel. Further still, embodiments of the invention do not suffer from "false positive" precautionary upcalls to check for interference upon each return from the kernel to an interrupted process containing critical code. Instead, in the present invention, a critical code trap signal is only generated if a thread is executing in a critical section and the thread is preempted or migrates to another processor while executing in the critical section. Further still, embodiments of the invention do not require a thread to register with the operating system before hand thus making them even more efficient. Instead, user threads that wish to utilize critical sections don't need to register, they can simply start using the features of embodiments of the invention by modifying the value of the critical code register as explained herein.

Another advantage of embodiments of the invention is that the invention can be implemented in software in existing, unmodified Intel-based (e.g., IA32) and SPARC-based computerized devices. That is, there is no requirement to modify the processor architecture to achieve the operation of embodiments of the invention.

In one embodiment, the critical code register is considered part of the thread's context like any other general purpose processor register value and each thread can have its own private critical code register value (of a range of possible values) that the operating system can save in that thread's context when a thread is not executing (e.g., during an interruption). In one embodiment, the critical code register is a hardware register and is not a memory location in its usual sense but instead is a storage location associated with the processor for use by thread, and each thread can maintain its own respective value from a range of values for the critical code register. A thread enters the kernel because of synchronous traps or external interrupts. When a thread is interrupted or descheduled the value of a thread's user-mode critical code register is stored in memory in the state save area associated with that thread. While a thread is executing its critical code register value is actually stored in the real hardware critical code register of the processor executing that thread. A thread's state save area actually contains the values of all the general registers for that thread at the time of the interrupt.

According to embodiments of this invention, the critical code register value for a particular thread can contain the following values:

a. "Critical Execution Condition" (CEC)—indicates that the thread is executing in a critical code section and needs to execute the critical section end-to-end, without interference.

b. "Critical Execution Failure" (CEF)—indicates that the thread was executing in a critical code section and was interrupted or incurred a context switch. The CEF value indicates that interference may have occurred and in one embodiment, the kernel or the operating system sets this value. If execution of a critical code section reaches a contingent instruction at the end of the critical code section and the critical code register value is "critical execution condition" then embodiments of the invention assume interference did not occur.

c. "Non-Critical Execution Condition" (NCEC) or "Normal" range values—CEC, CEF and normal or "Non-Critical Execution Condition" values are all distinct.

FIG. 1 illustrates a computerized device 100 configured according to one example embodiment of the invention. The computerized device 100 may be any type of computerized device or processing system such as a personal computer, workstation, portable computing device (e.g., laptop, palmtop or handheld computer), dedicated device, or the like. The computerized device 100 may also represent the architecture of the processing device such as a microprocessor, a controller, a central processing unit or other device containing circuitry to carry out the processing embodiments explained herein. The example computerized device 100 includes an interconnection mechanism 111 such as a data bus and/or circuitry which couples a memory 120 and a processor 110. The memory 120 may be any type of computer readable medium such as random access memory (RAM) and/or read only memory (ROM), a cache memory, a programmable memory, or even a persistent memory such as a readable and writeable disk or other storage medium. The processor 110 represents any type of logic processing circuitry that is capable of processing logic instructions, for example encoded as software (e.g., object code) within the memory 120.

In this example, the memory 120 is encoded with first and second non-operating system processes or threads 150 and 152 that in this example are user threads operating within software programs under control of a user (not specifically shown in this example) of the computerized device 100. The non-operating system threads 150 and 152 can each access (i.e., update) one or more of the same locations in shared memory 170 as will be explained. Typically, access to the shared memory 170 by either the first or second thread 150 or 152 is performed using a critical code section 160 to ensure that only one critical code section 160 in only one of the threads 150 or 152 is accessing the same location in the shared memory 170 at any one moment in time. Certain details of specific instructions within the first non-operating system thread 150 and within the critical code section 160 within the first thread 150 are shown as instructions 200 through 212 in this example embodiment of the invention. It is to be understood that all or only some of the memory 120 may be shared memory 170.

The memory 120 is also encoded in this example with an operating system 130 that includes one or more operating system or "kernel" threads or processes. In addition, the memory 120 includes a critical execution manager 140 configured to operate in conjunction with the operating system 130 as will be explained herein. The memory 120 further contains a critical code register 180 which serves as a memory location that can maintain values including a range of values corresponding either to a non-critical execution condition, a critical execution condition or a critical execution failure. Also in this example, the memory 120 includes a critical execution signal handler 180 that processes critical trap signals as will be explained.

FIG. 1 also illustrates a number of different data flows generally illustrated as numbered lines 200 through 211 between the various components within the memory 120. Each data flow 200 through 211 represents a specific operation, action, function call or signal. The specific data flows 200 through 204, and 210 through 212 generally correspond to operation of the logic instructions 200 through 204 in the non-operating system thread 150 and the critical code section 160. The numerical order of these data flows 200 through 211 illustrates an example order of operation of the computerized device 100 configured according to one embodiment of the invention in order to execute the critical code 160 within the first thread 150 without interference 206 to the shared memory 170 from the second thread 152. Such interference 206 potentially may occur during operation of the second thread 152 after an interruption 204 occurs to the first thread 150 (i.e., an interruption that occurs while executing the critical code section 160).

Figure 2:
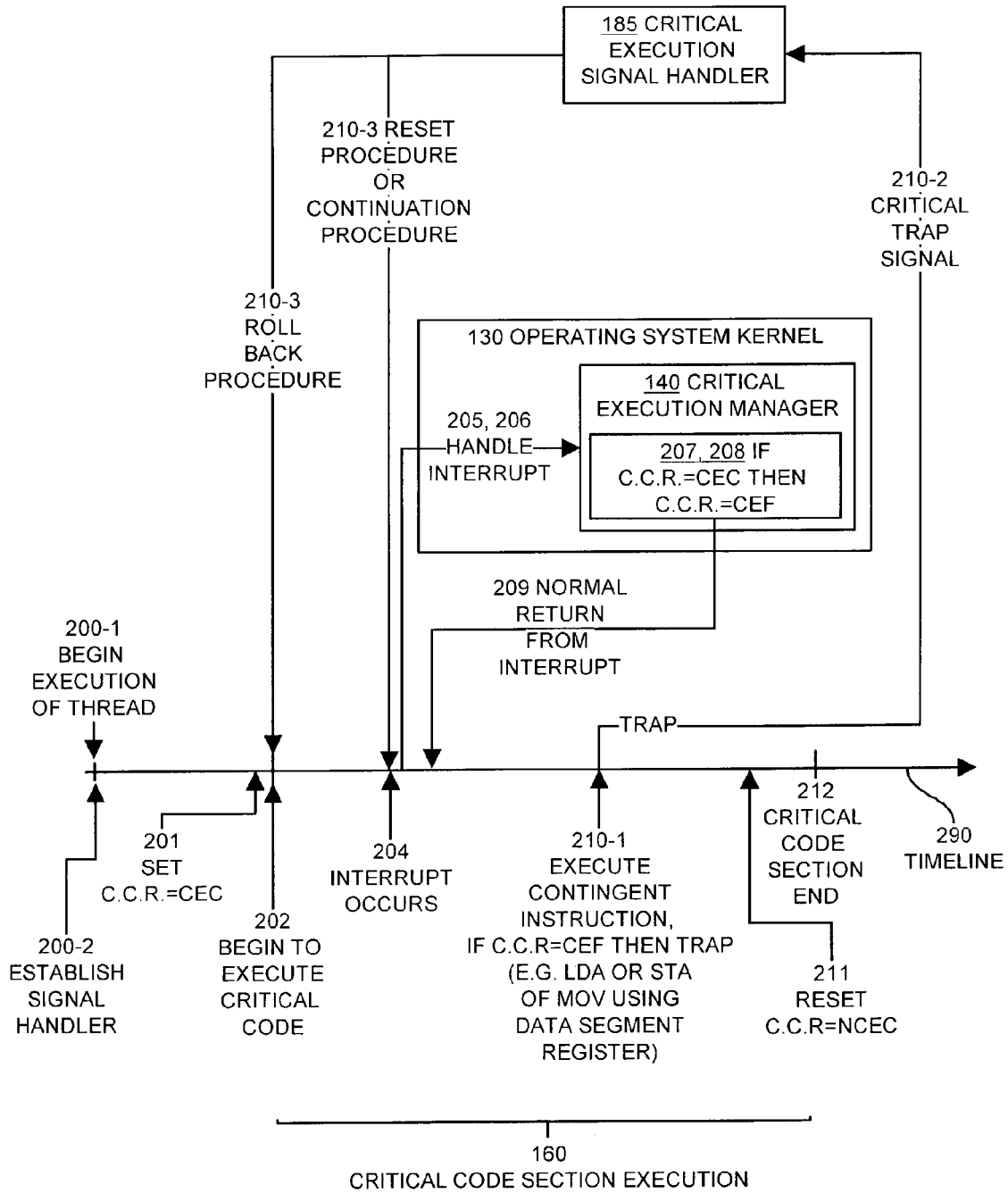
FIG. 2 illustrates a process control flow and timing diagram that shows operations of embodiments of the invention.

FIG. 2 shows a timeline 290 during which the corresponding numeric sequence of events, operations, conditions and/or signals 200 through 212 from FIG. 1 occurs according to one example operation of embodiments of the invention. That is, the events, signals and operations 200 through 211 illustrated in relation to the timeline 290 in FIG. 2 shows progression of the events illustrated in FIG. 1 with respect to the various software and hardware modules also explained above. A detailed explanation of the events 200 through 211 in FIGS. 1 and 2 will now be explained with respect to a flow chart of processing steps shown in FIG. 3.

Figure 3:
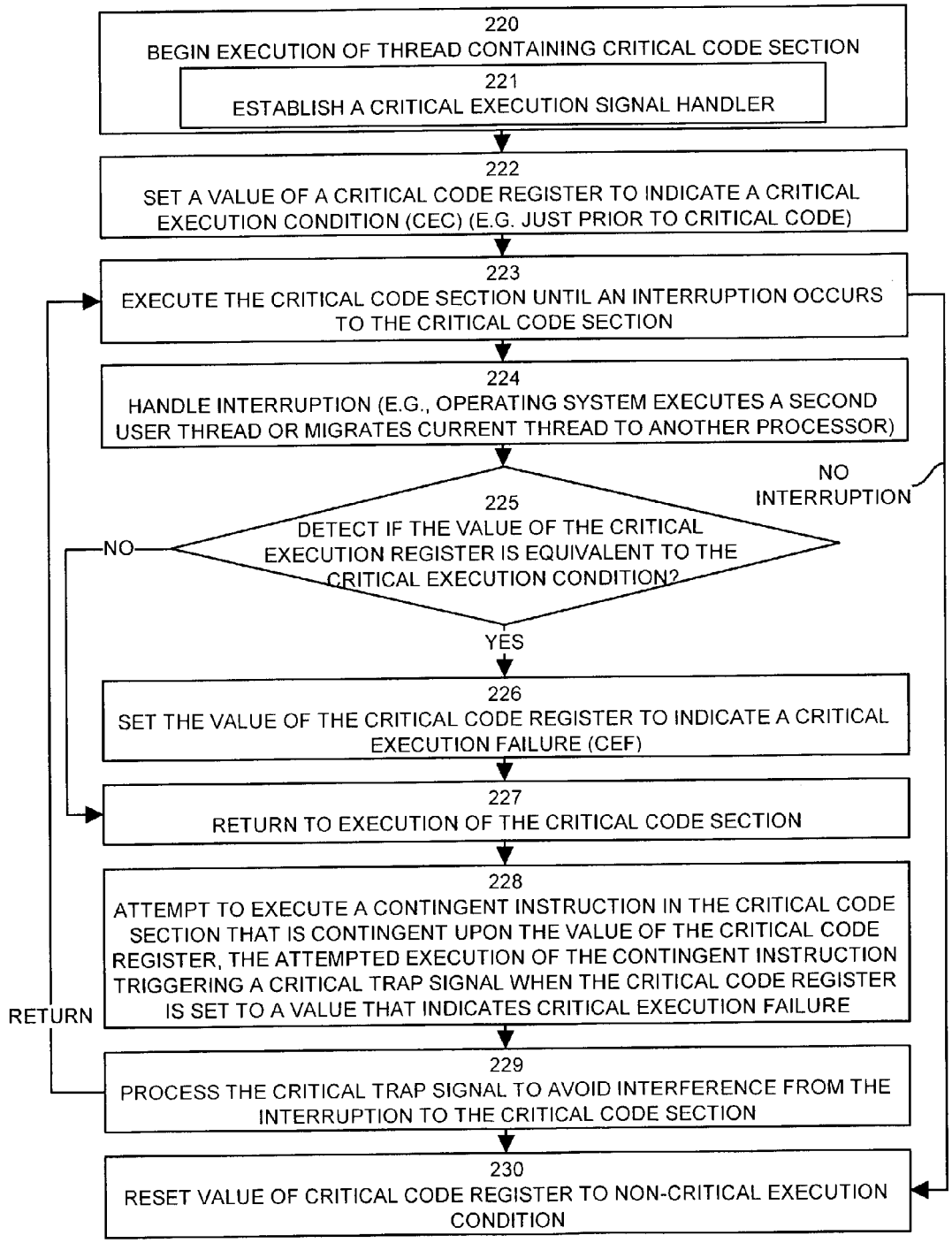

FIG. 3 is a flow chart of processing steps performed by a computerized device equipped with a critical execution manager 140 and one or more non-operating system threads 150, 152 containing critical code section(s) 160 configured according to one embodiment of the invention. Generally, the processing operations discussed in the flow chart of processing steps in FIG. 3 allows execution of the critical code section 160 while accounting for any interference that may be caused during handling of interruptions 204 that may occur while executing or otherwise performing the critical code section 160. The description of the processing steps shown in the flow chart in FIG. 3 will be provided in conjunction with reference to the example operational data flows 200 through 211 of the invention as illustrated in FIGS. 1 and 2.

In step 220, a first non-operating system thread 150 containing the critical code section 160 begins execution. To do so, the operating system 130 schedules and begins execution of the first thread 150 on the processor 110 within the computerized device 100. Either prior to the start of execution of the first thread 150, or prior to execution of any critical code sections 160, in step 221 the first thread 150 establishes a critical execution signal handler 185. Establishment of the critical execution signal handler 180 is shown in FIG. 1 at location 200 within the first thread code and by the data flow 200 from the first thread 150 to the critical execution signal and/or 180. This is also shown at location 200-2 on the timeline 290 in FIG. 2. Generally, the first thread 150 can establish the critical execution signal handler 185 in order to process signals such as a critical trap signal 210-2 in order to avoid interference from interruptions 204 that occur during operation of the critical code section 160, as will be explained.

Next, in step 222, prior to execution of the critical code 160 (i.e., at location 201 on the timeline 290 in FIG. 2), the first thread 150 contains an instruction 201 (FIG. 1) that sets a value of (i.e., loads into) the critical code register 180 to indicate a critical execution condition (CEC). As briefly discussed above, the critical code register 180 can contain a value upon which "contingent instructions" executed within non-operating system threads, such as the first and second threads 150 and 152, depend upon for complete operation. Depending upon the architecture of the computerized device 100, there are various alternative examples of the critical code register 180 in alternative embodiments of this invention.

As a first example, if the computerized device 100 operates a processor 110 configured according to a Scalable Processor Architecture (SPARC) or an equivalent processor manufactured, for example, by Sun Microsystems Inc., (or the computerized device 100 represents a high level architecture of a SPARC processor) the critical code register 180 may be an (i.e., the, as there is only one such register in the current processor implementation) address space identification (ASI) register (e.g., maintained within or accessible to the processor 110) that maintains (i.e., that can contain) address space identification values upon which successful execution of non-operating system thread contingent instructions such as a load-alternate instruction (LDA) or a store-alternate instruction (STA) are dependent. Standard design of a SPARC architecture defines a default numerical encoding for a default address space identification value. In particular, during normal operation of non-operating system threads the ASI register (i.e., the critical code register 180 in this example embodiment) contains a default value of ASI_PRIMARY that is equivalent, for embodiments of the invention, to a non-critical execution condition. In other words, ASI_PRIMARY identifies a normally accessible range of user accessible address space locations within the memory 120 and load-alternate (LDA) or store-alternate (STA) SPARC contingent instructions are able to properly execute within a user or other non-operating system thread (e.g., 150 or 152 in the example in FIG. 1) while the critical code register 180 contains the non-critical execution condition value of ASI_PRIMARY. By "properly execute", what is meant is that critical instructions will not cause a critical execution trap condition or signal if the address space identification register is set to a value of ASI_PRIMARY.

Embodiments of the invention operate to define a second value that may be maintained within the ASI register (i.e., within the critical code register 180). This secondary value is defined as ASI_SECONDARY and is a value equivalent to (i.e., that indicates) a critical execution condition. Specifically, in this embodiment, the ASI_SECONDARY value representing the critical execution condition is numerically distinct or identifiable from the ASI_PRIMARY value, but is aliased to the same user address space within the memory 120. In other words, embodiments of the invention in step 222 can set or change a value of the critical code register 180 from its default value of ASI_PRIMARY, defining a non-critical execution condition (i.e., defining normal execution of non-operating system code) to a new value of ASI_SECONDARY that represents a critical execution condition. Even though the critical execution value ASI_SECONDARY within the critical code register 180 (i.e., the ASI register in a SPARC processor) that the non-operating system thread 150 establishes in step 222 and at line 201 of the code in the example in FIG. 1 is different in its actual value from the ASI_PRIMARY value, this critical execution condition value ASI_SECONDARY will also not cause a contingent instruction to produce a critical trap signal.

Figure 4:
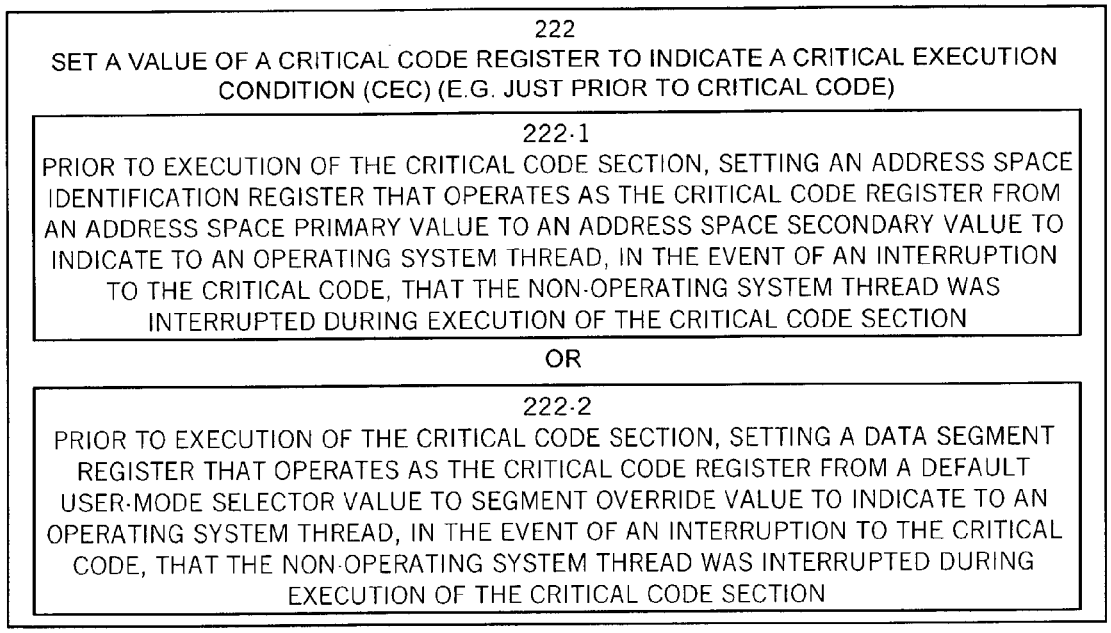

Directing attention briefly now to the flow chart of processing steps in FIG. 4, these steps 222-1 and 222-2 illustrate two alternative example operations performed according to embodiments of the invention to set a value of the critical code register 180 to indicate a critical execution condition. In particular, sub-step 222-1 in FIG. 4 illustrates the use of the address space identification (ASI) register in a SPARC-based processor architecture according to embodiments of the invention.

More specifically, in step 222-1 in FIG. 4, prior to execution of the critical code section 160, the first non-operating system thread 150 sets an address space identification register that operates (i.e., in this embodiment) as the critical code register 180 from an address space primary value (i.e., its default user thread value of ASI_PRIMARY) to an address space secondary value (e.g., ASI_SECONDARY) to indicate to an operating system thread (i.e., to the critical execution manager 140 as will be explained), in the event of an interruption to the critical code section 160, that a non-operating system thread 150 was interrupted during execution of the critical code section 160. As explained above, by setting the address space identification register to the ASI_SECONDARY value prior to entry of the critical code section 160, if an interruption 204 should occur during the critical code section 160, the operating system 130 will preserve or save the thread state of the first thread 150, which includes saving the value of the critical code register 180. Thereafter (i.e., after handling the interrupt), just prior to returning to execution of the critical code section 160, the critical execution manager 140 configured according to embodiments of the invention can detect the ASI_SECONDARY value within the critical code register 180 (i.e., from the save thread state which is now being restored) and can thus make the determination that interruption occurred during operation of the critical section 160 and can further perform processing of embodiments of the invention to handle any interference that may be present.

In an alternative embodiment of the invention in which the processor 110 is based on an Intel microprocessor architecture (i.e., a non-scalable processor architecture or IA32 architecture) such as one of the Pentium or Itanium line of microprocessors manufactured by Intel Corp., the critical code register 180 is a segment register, also referred to as a segment register. The IA32 CPUs have 6 segment registers: DS, ES, FS, GS, CS and SS. The "segment register" in these embodiments of the invention is another name for the DS register. In IA32-based embodiments of this invention, one of the segment registers also serves as the critical code register. The choice of exactly which segment register is used for the critical code register can be arbitrary, but preferably a developer will chose the FS register instead of the DS register, since the FS register is often otherwise unused. Also for this discussion of IA32 embodiments, "selectors" are special values that identify segments and "selector values" may be loaded into segment registers using certain instructions. Different selector numbers or values can map to the same segment. Thereafter, a load or store instruction (e.g., mnemonically, "MOV") can be prefixed or augmented with an optional "segment override prefix" directing that the load or store should be performed on the segment identified in the prefix. Using the prefix of a selector of the critical code register for such an instruction forms a contingent instruction for purposes of embodiments of this invention. Note that in the current IA32 architecture, there are 6 distinct prefixes, one each for DS, ES, FS, GS, CS and SS. Suppose some code wanted to fetch the byte at offset 10 from the segment identified by the selector value "22". A developer could use the following code:

mov fs, 22
    mov eax, fs:[10]

The instruction "mov FS, 22" loads the selector value into the FS segment register and the "mov eax, fs:[10]" causes this second "mov" instruction to reference the segment identified by the "22" value, assuming the user-thread is allowed to reference this area of memory. Thus the selector value placed into the FS segment register can control trap conditions associated with a subsequently executing contingent instruction such as the "mov eax, fs:[10]" instruction in the above example. The segment register values are part of a thread's context and the kernel saves these values as part of the threads context or state when the thread is interrupted. Accordingly, each thread has its own DS, FS, GS, ES, CS and SS values.

The segment register (e.g., the FS register in the above example) utilized in Intel-based embodiments of the invention can maintain a value of an address range that certain contingent instructions use during execution to access certain ranges of memory. In its default value, the segment register maintains a default user-mode selector value. A set of contingent instructions with the Intel-based processor architecture use a value of the segment register to determine where to access memory. According to embodiments of the invention, the segment register (e.g., FS register) can be configured with (e.g. can be loaded with) a selector value (e.g., selector value) that is different than the default user-mode segment selector value upon which non-operating system thread contingent instructions that reference to segment register (i.e., the critical code register 180 in this example) are dependent.

As an example, during normal operation of non-critical code within a non-operating system process, a contingent move instruction (MOV) can reference data within a segment area or range of memory 120 defined by the segment register. If the segment register references an area of memory 120 that is accessible by non-operating system threads such as user threads, the move instruction will operate properly and will not cause a critical trap signal. As with the SPARC architecture discussed above, embodiments of the invention are capable of defining a secondary value for this segment register (i.e., for the critical code register 180 in this example) that the non-operate system threads in step 222 can load into the segment register. This secondary value is a special selector value that, similar in nature to the ASI_SECONDARY for the SPARC-based processors. In embodiments of the invention, the selector value is aliased to the default user-mode selector value for the user or non-operating system segment of memory 120, and thus contingent instructions within the Intel processor architecture that execute and that are dependent upon the value of this segment register will not cause a critical trap signal to be produced when it is set to either the user-mode or default selector value or the selector value. Nevertheless, the special selector value referred to in embodiments of the invention as a "selector" value is different and the default or user-mode segment selector value and thus is identifiable. In embodiments of the invention then, the selector value is equivalent to the critical execution condition value and thus allows, as will be explained, the critical execution manager 140 within the operating system 130 to identify situations in which an interruption occurred during operation of critical code 160 within a non-operating system thread.

Directing attention to the flow chart in FIG. 4, step 222-1 illustrates processing involved in an alternative embodiment of the invention when using an Intel-based processor platform. Specifically, in step 222-2 in FIG. 4, prior to execution of the critical code section 160, the first non-operating system thread 150 sets a segment register that operates as the critical code register 180 from a default user-mode selector value (i.e., the value of a user segment address space) to a selector value (e.g., a secondary value of a user segment address space in memory) to indicate to an operating system thread (i.e., to the critical execution manager 140), in the event of an interruption to the critical code section 160, that the non-operating system thread 150 was interrupted during execution of the critical code section 160. As explained above, by setting the segment register in the Intel-based processor architecture to the selector value just prior to entry (i.e., execution) of the critical code section 160, if an interruption should occur during the operation of the critical code section 160, the operating system 130 will preserve or save the thread state of the first thread 150 which includes saving the value of the segment register 180. After handling the interruption and just prior to returning to execution of the critical code section 160, the critical execution manager 140 configured according to embodiments of the invention detects the selector value within the critical code register 180 (i.e., from the save thread state which is now being restored) and can thus make the determination that the interruption occurred during operation of the critical section 160.

As will be explained shortly, once the critical code register 180 (i.e., either the ASI register in a SPARC architecture or the segment descriptor register in an Intel-based architecture) is loaded with a value to indicate a critical execution condition in step 222, if an interruption occurs thereafter to critical code 160, the critical execution manager 140 can detect the critical execution condition within the critical code register 180 and can in turn establish a critical failure condition value within the critical code register 180 that will cause any subsequently executed contingent instructions within the critical code section 160 to produce a critical trap signal 210-2. Accordingly, once an interruption to critical code is processed by the operating system 130 and processing returns to the critical code, embodiments of the invention have setup a critical failure condition that will cause any subsequent contingent instructions to produce the critical trap signal thus invoking the critical to execution signal handler 185 to recover from any interference that may have been cause during interruption.

Returning attention to the flow chart of processing steps in FIG. 2, in step 223 the first thread 150 begins execution of the critical code section 160 until an interruption 204 occurs to the critical code section. As illustrated in FIG. 1, the critical code section 160 begins execution at line 202 and during its execution the critical code section 160 may access shared memory 203. During execution, the critical code section 160 experiences an interruption 204 at which point the processor 110 transfers control to the operating system 130. There may be numerous reasons why the interruption occurs.

Figure 5:
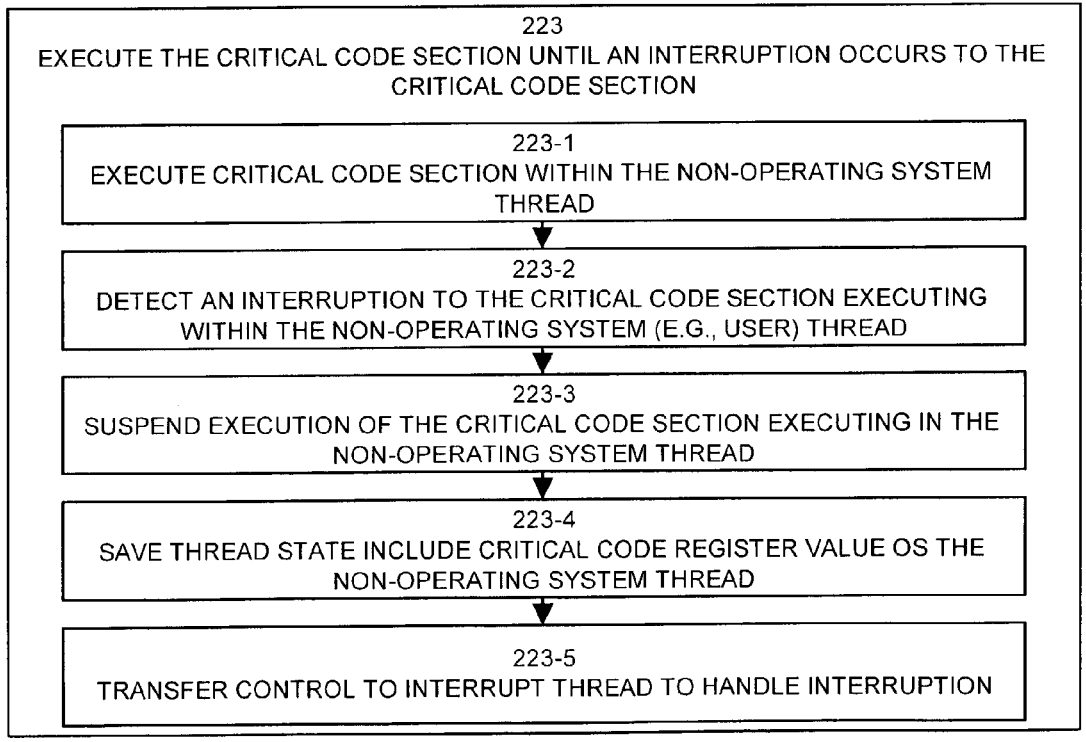

FIG. 5 is a flow chart of processing steps 223-1 through 223-5 that illustrates example processing operations of step 223 that a computerized device 100 performs to execute the critical code section 160 until an interruption 204 occurs to the critical code section 160.

In step 223-1, the first non-operating system thread 150 executes the critical code section 160 beginning at position 202 in FIG. 1 on the time line 290 in FIG. 2.

Next, in step 223-2 and at location 204 on the time line 290 in FIG. 2, the processor 110 (i.e., the operating system 130 operating on the processor 110) detects an interruption to the critical code section 160 executing within the non-operating system thread 150. Perhaps a time slice allocated by the processor 110 for execution of the first thread 150 has expired, thus causing the interruption.

In step 223-3, in response to the interrupt 204, the operating system 130 suspends execution of the critical code section 160 executing in the non-operating system thread 150.

In step 223-4, the operating system 130 saves any thread state including the value of the critical code register 180 associated with the non-operating system thread 150. In this manner, the value that the first non-operating system thread 150 previously established within the critical code register 180 just prior to execution of the critical code section 160 is saved while the operating system 130 handles the interruption 204.

In step 223-5, the operating system 130 then transfers control to another operating system thread to handle or process the interruption (e.g., to possibly schedule another user thread 152).

Returning attention back to the flow chart of processing steps in FIG. 3, in step 224, the operating system 130 handles (e.g., 205 and 206 in FIG. 1) the interruption 204. In the example illustrated in FIG. 1, during the period of interruption of the critical code section 160, the operating system 130 may schedule and start the operation of or transfer control to 205 a second non-operating system thread 152 (e.g., another user thread) for execution on the processor 110. During the operation 205 of the second non-operating system thread 152, the second thread 152 may access the shared memory 170, thus causing interference 206 to the information previously accessed within the shared memory 170 by the critical code section 160 in the first thread 150 at location 203, as previously discussed. In other words, when the critical code section 160 is interrupted at location 204 and the operating system 130 schedules and causes operation 205 of the second thread 152, the second thread 152 may include instructions that access the same shared memory locations 170 thus causing modification (i.e., interference 206) to those shared memory locations 170. The interference 206 may include modifying values of the shared memory 170 that the critical code section 160 previously established during execution of the shared memory access instruction 203. Since the critical code section 160 has not completed its full execution (i.e., due to the interruption is did not execute atomically), this modification to the shared memory 170 constitutes interference and upon return to execution of the critical code section 170, this interference 205 (or its potential to exist) must be accounted for or compensated for in a manner that will be explained in detail herein.

Upon completion of the execution 205 of the second non-operating system thread 152 (e.g., perhaps the time slice for this thread has now ended and it is again time to execute the first non-operating system thread 150, or perhaps this thread 152 experiences an interrupt of its own), processing control returns to the operating system 130 at which point embodiments of the invention cause the operating system 130 to invoke operation of the critical execution manager 140 configured according to embodiments of the invention. In this example, the critical execution manager 140 may be part of, or an extension to, the kernel thread(s) within the operating system 130.

In step 225 and at location 207 and 208 in FIG. 2, the critical execution manager 140 detects or determines if the value of the critical execution register 180 is equivalent to the critical execution condition 201. In this example, since the first non-operating system thread 150 previously established the critical execution condition (CEC) value 201 within the critical code register 180 just prior to execution of the critical code section 160, upon restoring the state associated with the first non-operating system thread 150, the critical code register 180 associated with this critical code section 160 does contain the critical execution condition value 201. In step 225 then, the critical execution manager 140 reads, loads or otherwise accesses 207 the critical execution condition value within the critical code register 180.

If the architecture of the processor 110 is a SPARC-based architecture, in step 225 the critical execution manager 140 determines if the address space identification register operating as the critical code register 180 contains the address space secondary (ASI_SECONDARY) value indicating a critical execution condition that was in the existence prior to and during the interruption of the critical code section 160. Alternatively, if the architecture of the processor 110 is an Intel-based architecture, in step 225 the critical execution manager 140 determines if the specific segment register operating as the critical code register 180 contains the selector value indicating a critical execution condition that was in existence prior to the interruption of the critical code section 160. In both examples, the critical execution condition 201 within the critical code register 180 allows the critical execution manager 140 to determine that the interruption 204 occurred during execution of the critical code section 160. Accordingly, processing proceeds to step 226.

In step 226, in response to detecting that the value of the critical execution register 180 is equivalent to the critical execution condition, the critical execution manager 140 sets the value of the critical code register 180 to indicate a critical execution failure (CEF) value 208. The critical execution failure value is a value that the critical execution manager 140 loads, writes or otherwise places into the critical code register 180 and that will cause subsequently executed contingent instructions that are dependent upon the value within the critical code register 180 to produce a critical trap signal 210-2.

In one embodiment of the invention the architecture of the processor 110 is a SPARC-based processing architecture and the critical execution manager 140 sets the value for the critical execution failure (CEF) 208 within the address space identification register (i.e., the critical code register 180 in a SPARC-based architecture) to be ASI_NUCLEUS, which is an address space identification register value that is specifically reserved within the SPARC processor architecture for contingent instructions that operate within operating system (i.e., kernel) threads, as opposed to user threads.

In an alternative embodiment of the invention, if the architecture of the processor 110 is an Intel-based processing architecture, in step 226 the critical execution manager 140 sets the value for the critical execution failure (CEF) 208 into the segment register (i.e., the critical code register 180 in an Intel-based architecture) to contain a non-user-mode selector value that represents a critical execution failure, such as a "null" selector value. Upon doing so, if a non-operating system thread such as a user process or thread 150 attempts to execute contingent load or store access instructions within the critical code section 160, when these contingent instructions reference the non-user mode selector value of "null", they will fault producing a critical trap signal 210-4.

After processing of step 226 is complete, the critical execution manager 140 (i.e., a kernel thread) completes operation of processing and the operating system 130 returns 209 to execution of the critical code section 160 in step 227. Returning attention briefly to step 225, if the non-operating system thread 150 were interrupted in an area of code other than the critical code section 160, the critical code register 180 would not contain a value equivalent to the critical execution condition 201 but instead would contain a value equivalent to the non-critical execution condition (i.e., a default value) such as ASI_PRIMARY (for SPARC based processor architectures) or a reference to a user-mode or default segment selector value within the segment register (for Intel-based architectures). In this situation, the critical execution manager 140 in step 225 does not proceed to step 226 but instead the processing of step 226 proceeds directly to step 227 to return to execution of user thread 150 (i.e., code in the thread 150 other than the critical code section 160, since the interruption occurred elsewhere in the thread 150). Accordingly, if the critical code register 180 contains a default value indicating a non-critical execution condition, the critical execution manager 140 can assume that the interruption did not occur during execution of a critical code section 160 and thus in step 226, the critical execution manager 140 does not modify the value of the critical code register 180 to be the critical failure condition. This is indicated at locations 207 and 208 in FIG. 2 within the critical execution manager 140 that contains logic instructions that state that if the critical execution register (C.E.R.) equals a critical execution condition (CEC) then set the critical execution register (C.E.R.) equal to a critical failure condition (CEF).

In step 227, the critical execution manager 140 allows the operating system 140 to return to execution of the non-operating system thread 150 at the point of interruption. In the forgoing examples, this location 209 is within the critical code section 160 at location 209 in FIG. 1.

In step 228 the critical code section 160 continues execution attempts to execute a contingent instruction 210 that is contingent upon the value of the critical code register 180. Preferably, the contingent instruction 210 is placed at the end of the critical code section 160 (e.g., as the last instruction in the critical code). The attempted execution 210-1 (FIG. 2) of the contingent instruction 210 accesses 210-1 (FIG. 1) the contents of the critical code register 180 and due to the critical execution failure (CEF) condition value contained therein, triggers a critical trap signal 210-2 (FIGS. 1 and 2). In other words, the contingent instruction 210 traps 210-2 when the critical code register 180 is set to a value that indicates the critical execution failure (CEF). In this manner, any contingent instructions that the critical code section 160 attempts to execute after an interruption that is processed by a kernel configured according to embodiments of the invention triggers the critical trap signal 210-2 because the critical code register 180 no longer contains an acceptable value that allows completion of execution of contingent instructions, but rather contains the critical execution failure condition value that the critical execution manager 140 establishes prior to returning to non-operating system thread execution (if the thread was interrupted during critical code) as discussed above.

FIG. 6 is a flow chart of processing steps to illustrate details of alternative processing configurations of step 228 from a flow chart in FIG. 3.

In step 228-1, if the processor architecture is a scalable processor architecture (e.g., a SPARC-based processor), the critical code section 160 attempts to execute a scalable processor architecture based contingent instruction (e.g., LDA or STA) within the non-operating system thread 150 that requires, for successful execution, that the address space identification register 180 (i.e., the critical code register 180) is set to at least one valid non-operating system thread address space identification value (e.g., an address space primary value ASI_PRIMARY or an address space secondary value ASI_SECONDARY) that is not equal to a value representing the critical execution failure (e.g., ASI_NUCLEUS). In other words, in step 228-1, if the address space identification register 180 is set to a value equivalent to ASI_NUCLEUS, attempted execution of contingent instructions such as LDA or STA within the non-operating system thread 150 will fault and trigger the trap signal 210-2.

Alternatively, in step 228-2, if the processor architecture is a non-scalable processor architecture (e.g., and Intel-based processor), the critical code section 160 attempts to execute a non-scalable processor architecture based contingent instruction within the non-operating system thread 150 that requires, for successful execution, that the critical code register 180 contains a segment selector value that is not equal to a value representing the critical execution failure (e.g., that is non-null). Accordingly, in step 228-2 if the register 180 is set to an invalid segment selector override value such as "null", contingent instructions such as loads or stores within the non-operating system thread 150 will fault during execution of a reference to segment register value using "null" and will thus producing a critical trap signal 210-2.

Returning attention to the flow chart in FIG. 3, in step 229, after producing a critical trap signal 210-2, the processor 110 causes processing to transfer to the user-mode critical execution signal handler 185 to process the critical trap signal 210-2 in order to detect, overcome or avoid interference 206 from the interruption 204 to the critical code section 160. Details of available processing operations that the critical execution signal handler 185 performs in response to receipt of the critical trap signal 210-2 include a variety of different interference recovery options depending upon different configurations of embodiments of the invention. Briefly, the critical execution signal handler 185 can perform any of the interference detection and recovery options described in detail within co-pending U.S. Application for Letters Patent entitled "METHODS AND APPARATUS FOR EXECUTING CODE WHILE AVOIDING INTERFERENCE" filed Nov. 20, 2001 and having U.S. Ser. No. 10/044,214. This co-pending patent application shares co-inventorship with the present invention and is assigned to the same assignee as the present invention. The entire teachings and contents of this reference co-pending patent application are hereby incorporated herein in their entirety.

FIG. 7 is a flow chart of processing steps performed according to example embodiments of the invention that illustrate various processing operations that the critical execution signal handler 185 can perform to avoid interference 206 from any interruptions 204 that may occur during execution of the critical code section 160. In other words, the flow chart in FIG. 7 illustrates details of different example embodiments of the invention that implement the processing of step 229 FIG. 3.

In step 229-1, production of the critical trap signal 210-2 invokes operation of the critical execution signal handler 185 that first resets the critical code register 180 to a critical execution condition (e.g., thus resetting the current critical execution failure condition value with either ASI_SECONDARY for SPARC-based processor architectures or to a critical segment selector override value for Intel-based processor architectures) and then processes the critical code section 160 to detect and overcome any interference 206 caused by the interruption 204 to the critical code section 160. Depending upon the embodiment of the invention, sub-steps 229-2 through 229-4 provide three alternative processing operations that process any interference 206 caused during processing an interrupt 204 to the critical code section 160.

In step 229-2, the critical execution signal handler 185 operates a critical code section reset procedure that reset information associated with the critical code section 160 to a set of initial values and restarts execution of the critical code section 160 from the beginning (instruction 202 in FIG. 1) of the critical code section 160. In other words, in sub-step 229-2, the critical execution signal handler 185 reset all register and stack values, memory locations, and/or other information to a thread state as it existed just prior to operation of the critical code section 160 and then restarts execution of the critical code section 160 from the beginning location 202. Note that fir step 229-2, the processing of resetting the value of the critical code register 180 does not need to be performed. That is, the critical code register reset processing in step 229-1 can be skipped if the option of processing step 229-2 is performed. This is because the critical code section 160 will usually reload the critical execution condition into the critical code register upon restarting.

In step 229-3, the critical execution signal handler 185 operates a critical code section rollback procedure that resets information associated with the critical code section 160 to a state that existed just prior to the interruption point 204 (FIGS. 1 and 2) and restarts the execution of the critical code section 160 from the point of interruption 204 in the critical code section 160. In other words, using the critical code section rollback procedure, the critical execution signal handler 185 does not require execution of the critical code section 160 from the beginning 202 but rather, can reset variable state or memory location information associated with information accessed by the critical code section 160 to its values or state that existed just prior to the interruption point 204 and can then resume execution at that location 204 instead of having to re-execute the entire section of critical code for the beginning 202.

In yet another alternative embodiment of the invention, in step 229-4, the critical execution signal handler 185 operates a critical code section continuation procedure that confirms that the interruption 204 to the critical code section 260 did not adversely effect information associated with the critical code section 160 and therefore allows execution of the critical code section 160 to continue from the point of interruption 204 to the critical code section 160. In other words, in the embodiment in step 229-4, the critical execution signal handler 185 can determine if any interference 206 was caused or not and if no interference 206 was caused to state information associated with or accessed by the critical code section 160, processing can proceed within the critical code section 160 as if no interruption had occurred all.

In any event, the critical execution signal handler 185 returns processing in step 229 to step 223 in FIG. 3 to continue execution of the critical code section 160 until either in another interruption occurs or until no interruption occurs. Upon completion of execution of the critical code section 160 in either step 223 on its initial operation or on a repeating operation after processing steps 224 through 229, processing proceeds to step 230.

In step 230, upon completion of execution of the critical code section 160, the critical code section 160 resets 211 the value of the critical code register 180 to a non-critical execution condition value 211. In this manner, the critical code section 160 clears the critical execution condition value from the critical code register 180 and replaces this value with a non-critical execution condition value such that contingent instructions that may subsequently appear within non-critical portions of the code within the non-operating system thread 150 will not cause a critical trap signal during their execution. Note that the processing of step 230 may be optional in certain embodiments of the invention, and if it is not reset and remains set either to the critical execution condition (as set, for example, upon entry into the critical code section) or remains set to the critical failure condition, this is not necessarily harmful as reentry into another section of critical code can take care or setting it back to the critical execution condition.

An example of thread code configured in accordance with one example embodiment of the invention to operate on a SPARC-based processor architecture appears as follows:

| SPARC-based thread code example | |
|---|---|
| ... //begin critical code section ... | |
| mov ASI_SECONDARY, %asi | // start of critical section |
| | // %asi serves as CCR |
| | // ASI_SECONDARY serves as CEC |
| c = compute_address_ of_cpu_specific_data( ) | |
| ld c->value, v | // fetch CPU-specific field |
| inc v | // increment value |
| sta v, [c->value]%asi | // attempt store thus attempting |
| | // to update CPU-specific data. |
| | // this is "contingent instruction" |
| ... //end critical code section | |

A second example of thread code configured in accordance with one example embodiment of the invention appears as follows:

| IA32-based thread code example | |
|---|---|
| ... //begin critical code section ... | |
| mov special_sei, %fs | // start critical section |
| | // %fs serves as CCR |
| | // special_sel serves as CEC. |
| ecx = compute_address_ of_cpu_specific_datum ( ) | |
| mov (%ecx), %edx | // fetch CPU-specific datum |
| inc %edx | // increment value |
| mov edx, %fs:(edx) | // store operation: commit point for |
| | // transaction - "contingent instruction" |
| ... //end critical code section | |

The comments at the end of each line of code in the two above code examples explain the instruction for that line and are self-explanatory in relation to the aforementioned description of embodiments of the invention.

From the aforementioned description, embodiments of the invention provide mechanisms to detect when critical code sections 160 within non-operating system threads are interrupted during their execution and further provide mechanisms for insuring that any event of such interruption, subsequent execution of the critical code sections 160 triggers a critical trap signal through the use of contingent instructions which are typically play the end of the critical code section 160.

Those skilled in the art will understand that there can be many variations made to the embodiments explained above while still achieving the same objective of those embodiments and the invention in general. As an example, embodiments of the invention may utilize one of more of the interference handling strategies in step 229 (FIG. 7) to recover from a critical trap signal that may have caused interference. In addition, embodiments of the invention are not limited to the specific contingent instructions noted above.

According to another alternative embodiment, the critical execution manager implementation can toggle the user-mode critical code register value from "critical execution condition" to "critical execution failure" any time there is an interrupt to a user-mode thread. Such a check can be placed in the kernel within kernel code that "unwinds" from kernel-mode to user-mode. As a specific example, the Intel-based process architecture (IA32) uses a special "interrupt-return instruction" (IRET) to return to user-mode while the SPARC uses a special "Return-from-trap" (RTT) instruction to return to user-mode. In this embodiment, placing the check immediately prior to the IRET or RTT is sufficient. Simple interrupts that do not cause context switching typically do not cause interference. As an example suppose a packet arrives on an Ethernet adapter and generates a "packet ready" interrupt. Further suppose the kernel services the interrupt and returns immediately to the interrupted thread. Furthermore, suppose the interrupted thread was executing in a critical code section (its critical code register value was set to "critical execution condition"). In this embodiment, the critical execution manager includes the statement to change the value of the critical code register (i.e., CEC to CEF) immediately prior to the IRET/RTT instruction. Accordingly, even if a thread is interrupted by a "simple" interrupt that might not cause interference, its value will change from CEC to CEF. When the thread reaches the contingent instruction, the contingent instruction will trap due to the setting of the critical code register. Note, however, that there was no chance of interference as the kernel didn't schedule any other threads since the start of the critical section. Accordingly, this is a more conservative but less inefficient embodiments of the invention since the thread didn't really need to take the trap and restart or recover from the critical section.

Another embodiment provides a refinement that avoids many such "false interference traps". In this alternative embodiment, the critical execution manager check for the value in the critical code register is placed (i.e., in kernel code) away from the IRET/RTT code path into a kernel's context switch subroutine. Accordingly, the kernel will only toggle a thread's CCR value from CEC to CEF if the thread is context switched. The appearance of a context switch interruption implies that other threads might run, possibly interfering with the memory locations accessed by the interrupted thread's critical section.

In yet another alternative, thread processing can read the value of the critical code register immediately prior to executing the contingent instruction. If the value is CEC then this processing can allow control to pass to the contingent instruction. Otherwise, if the value of the critical code register is CEF (indicating an interruption), the thread processing can branch directly to the restart/recover logic (e.g., as implemented in the signal handler in embodiments explained above), thereby skipping the expensive trap and signal handler path. Using this scheme, the only time a contingent instruction would generate an interference trap is when an interrupt/context switch occurred in the small window of time after the explicit critical code register check and the contingent instruction. In other words, this enhancement would reduce the interference trap rate.

Such variations are intended to be covered by the scope of this invention. As such, the foregoing descriptions of embodiments of the invention are not intended to be limiting.

What is claimed is:

1. A method for executing a critical code section, the method comprising:
    setting a value of a critical code register to indicate a critical execution condition;
    executing the critical code section until an interruption occurs to the critical code section;
    in response to the interruption to the critical code section, setting the value of the critical code register to indicate a critical execution failure;
    returning to execution of the critical code section and attempting to execute a contingent instruction in the critical code section that is contingent upon the value of the critical code register, the attempted execution of the contingent instruction triggering a critical trap signal when the critical code register is set to a value that indicates the critical execution failure; and
    processing the critical trap signal to avoid interference from the interruption to the critical code section.

2. The method of claim 1 wherein setting a value of a critical code register to indicate a critical execution condition comprises:
    establishing a critical execution signal handler prior to execution of the critical code section, the critical execution signal handler capable of processing the critical trap signal to avoid interference from the interruption to the critical code section.

3. The method of claim 2 wherein the critical code section is within a non-operating system thread and wherein executing the critical code section until an interruption occurs comprises:
    executing the critical code section within the non-operating system thread;
    detecting an interruption to the critical code section executing with the non-operating system thread; and
    in response to the interruption to the critical code section, suspending execution of the critical code section and transferring control to a kernel code section within a kernel thread; and
    wherein returning to execution of the critical code section comprises:
    after handling the interruption to the critical code section, transferring control from the kernel thread to the non-operating system thread to return to execution of the critical code section at a position in the critical code section at which the interruption was detected to the critical code section.

4. The method of claim 3 wherein setting the value of the critical code register to indicate a critical execution failure operates in the kernel code section within the kernel thread and comprises:
    detecting if the value of the critical code register is equivalent to the critical execution condition, and if the value of the critical code register is equivalent to the critical execution condition, setting the value of the critical code register to indicate a critical execution failure.

5. The method of claim 4 wherein attempting to execute a contingent instruction in the critical code section that is contingent upon the value of the critical code register comprises at least one of:
    i) attempting to execute a scalable processor architecture based contingent instruction within a non-operating system thread that requires, for successful execution, that an address space identification register operating as the critical code register be set to at least one valid non-operating system thread address space identification value that is not equal to a value representing the critical execution failure; and
    ii) attempting to execute a non-scalable processor architecture based contingent instruction within a non-operating system thread that requires, for successful execution, that the critical code register contains a segment selector value that is not equal to a value representing the critical execution failure.

6. The method of claim 5 wherein:
    the at least one attempted execution of the scalable processor architecture based contingent instruction; and
    the at least one attempted execution of the non-scalable processor architecture based contingent instruction
    are performed upon returning to execution of the critical code section within the non-operating system thread while the critical code register contains a value representing the critical failure condition, and wherein the at least one such attempted execution causes the critical trap signal.

7. The method of claim 5 wherein processing the critical trap condition to handle interruption to the critical code section is performed in response triggering the critical trap signal and comprises:
    invoking operation of the critical execution signal handler to process the critical code section according to at least one of:
    i) a critical code section reset procedure that resets information associated with the critical code section to a set of initial values and restarts execution of the critical code section from a beginning of the critical code section;
    ii) a critical code section rollback procedure that resets information associated with the critical code section to a state that existed just prior to the interruption and restarts the execution of the critical code section from a point of interruption to the critical code section; and
    i) a critical code section continuation procedure that confirms the interruption to the critical code section did not adversely effect information associated with the critical code section and allows execution of the critical code section to continue from the point of interruption to the critical code section.

8. The method of claim 1 wherein the critical code register maintains values for use by contingent instructions whose execution in the critical code section within a non-operating system thread is contingent on the value of the critical code register;
    and wherein the critical code register is at least one of:
    i) an address space identification register in a scalable processor architecture processor, the address space identification register maintaining address space identification values upon which successful execution of at least one of a non-operating system thread contingent load-alternate instruction and a non-operating system thread store-alternate instruction is dependent; and ii) a segment register in non-scalable processor architecture processor, the segment register maintaining a selector value that is different than a default segment selector value upon which successful execution of non-operating system thread contingent instructions that reference the segment register is dependent.

9. The method of claim 1 wherein setting a value of the critical code register to indicate a critical execution condition comprises:

prior to execution of the critical code section, setting an address space identification register that operates as the critical code register from an address space primary value to an address space secondary value to indicate to an operating system thread, in the event of an interruption to the critical code, that the non-operating system thread was interrupted during execution of the critical code section.

10. The method of claim 1 wherein the step of setting a value of the critical code register to indicate a critical execution condition comprises:

prior to execution of the critical code section, setting a segment register that operates as the critical code register from a default user-mode selector value to selector value to indicate to an operating system thread, in the event of an interruption to the critical code, that the non-operating system thread was interrupted during execution of the critical code section.

11. In a kernel thread, a method for processing interruptions to non-operating system threads, the method comprising the steps of:

detecting an interruption to the non-operating system thread; and in response to the interruption, suspending execution of the non-operating system thread and transferring control to a kernel thread;

detecting if a value of a critical code register is equivalent to a critical execution condition, and if the value of the critical code register is equivalent to the critical execution condition, setting the value of the critical code register to indicate a critical execution failure; and after handling the interruption to the non-operating system thread, transferring control from the kernel thread to the non-operating system thread to return to execution of the non-operating system thread at a position in the non-operating system thread at which the interruption was detected.

12. The method of claim 11 wherein the critical code register is at least one of:

i) an address space identification register in a scalable processor architecture processor that maintains address space identification values upon which successful execution of at least one of a non-operating system thread contingent load-alternate instruction and a non-operating system thread store-alternate instruction is dependent; and ii) a segment register in non-scalable processor architecture processor that maintains a selector value that is different than a default segment selector value upon which successful execution of non-operating system thread contingent instructions that reference the segment register is dependent.

13. A method for executing a non-operating system thread containing a critical code section, the method comprising:

establishing a critical execution signal handler prior to execution of the critical code section in the non-operating system thread, the critical execution signal handler capable of processing a critical trap signal to handle interference from any interruption to the critical code section;

prior to execution of a critical code section, setting a value of a critical code register to indicate a critical execution condition;

executing the critical code section including at least one contingent instruction whose successful execution in the critical code section is contingent on the value of the critical code register being non-equivalent to a critical execution failure; and subsequent to executing the critical code section, resetting the value of a critical code register to indicate a non-critical execution condition.

14. The method of claim 13 wherein executing the critical code section including at least one contingent instruction comprises:

attempting to execute the at least one contingent instruction when the critical code register contains a critical failure condition such that the attempted execution of the at least one contingent instruction faults and produces a critical trap signal that invokes the critical execution signal handler.

15. The method of claim 13 wherein the critical code register is at least one of:

i) an address space identification register in a scalable processor architecture processor that maintains address space identification values upon which successful execution of at least one of a non-operating system thread contingent load-alternate instruction and a non-operating system thread store-alternate instruction are dependent; and ii) a segment register in non-scalable processor architecture processor that maintains a selector value that is different than a default segment selector value upon which successful execution of non-operating system thread contingent instructions that reference the segment register is dependent.

16. In an operating system, a method of executing a non-operating system thread comprising:

detecting an interruption to the non-operating system thread;

processing the interruption to the non-operating system thread;

detecting if a value of a critical code register associated with the non-operating system thread is equivalent to a critical execution condition, and if the value of the critical code register is equivalent to the critical execution condition, setting the value of the critical code register to indicate a critical execution failure; and returning to execution of the non-operating system thread at a point of occurrence of the interruption to the non-operating system thread.

17. The method of claim 16 wherein the operating system is designed to operate on a scalable processor architecture processor and wherein the critical code register associated with the non-operating system thread is an address space identification register and wherein detecting if a value of a critical code register associated with the non-operating system thread is equivalent to a critical execution condition comprises:

detecting if the address space identification register contains an address space identification secondary value; and wherein setting the value of the critical code register to indicate a critical execution failure comprises:
setting the value of the critical code register to an address space identification failure value that will cause execution of a contingent instruction in a non-operating system thread to produce a critical trap signal.

18. The method of claim 16 wherein the operating system is designed to operate on a non-scalable processor architecture processor and wherein the critical code register associated with the non-operating system thread is a segment register and wherein detecting if a value of a critical code register associated with the non-operating system thread is equivalent to a critical execution condition comprises:
detecting if the segment register contains a selector value; and
wherein setting the value of the critical code register to indicate a critical execution failure comprises:
setting the value of the critical code register to an selector failure value that will cause execution of a contingent instruction in a non-operating system thread to produce a critical trap signal.

19. A computerized device comprising:
a processor;
a memory encoded with logic instructions that form an operating system and a critical execution manager; and
an interconnection mechanism coupling the processor and the memory;
wherein the processor executes the logic instructions that form the operating system and a critical execution manager, such execution causing the computerized device to perform the operations of:
detecting an interruption to a non-operating system thread executing with in the computerized device;
processing the interruption to the non-operating system thread;
detecting if a value of a critical code register in the processor associated with the non-operating system thread is equivalent to a critical execution condition, and if the value of the critical code register is equivalent to the critical execution condition, setting the value of the critical code register to indicate a critical execution failure; and
returning to execution of the non-operating system thread at a point of occurrence of the interruption to the non-operating system thread.

20. The computerized device of claim 19 wherein the computerized device is configured according to a non-scalable processor architecture and wherein the critical code register is a segment register.

21. The computerized device of claim 19 wherein the computerized device is configured according to a scalable processor architecture and wherein the critical code register is an address space identification register.

22. A computerized device comprising:
a processor;
a memory encoded with logic instructions that form a critical execution signal handler and a non-operating system thread containing a critical code section; and
an interconnection mechanism coupling the processor and the memory;
wherein the processor executes the logic instructions that form the non-operating system thread, such execution causing the computerized device to perform the operations of:
establishing the critical execution signal handler prior to execution of the critical code section in the non-operating system thread, the critical execution signal handler capable of processing a critical trap signal to handle interference from any interruption to that may occur during execution of the critical code section;
prior to execution of a critical code section, setting a value of a critical code register to indicate a critical execution condition;
executing the critical code section including at least one contingent instruction whose successful execution in the critical code section is contingent on the value of the critical code register being non-equivalent to a critical execution failure; and
subsequent to executing the critical code section, resetting the value of a critical code register to indicate a non-critical execution condition.

23. The computerized device of claim 22 wherein when the processor executes the critical code section including at least one contingent instruction, the computerized device executes the at least one contingent instruction when the critical code register contains a critical failure condition, such that the execution of the at least one contingent instruction faults and produces a critical trap signal that invokes the processor to perform the critical execution signal handler.

24. A computerized device comprising:
a processor;
a memory encoded with logic instructions that include a critical execution signal handler, a non-operating system thread containing a critical code section, and a critical execution manager; and
an interconnection mechanism coupling the processor and the memory;
wherein the processor executes the logic instructions of the non-operating system thread to cause the computerized device to perform the operations of:
setting a value of a critical code register to indicate a critical execution condition;
executing the critical code section until an interruption occurs to the critical code section; and
wherein the processor executes the logic instructions of the critical execution manager to cause the computerized device to perform the operations of:
in response to the interruption to the critical code section, detecting if a value of a critical code register in the processor associated with the non-operating system thread is equivalent to a critical execution condition, and if the value of the critical code register is equivalent to the critical execution condition, setting the value of the critical code register to indicate a critical execution failure;
returning to execution of the critical code section;
wherein the processor executes the logic instructions of the critical execution manager to cause the computerized device to perform the operations of:
attempting to execute at least one contingent instruction when the critical code register contains a critical failure condition such that the attempted execution of the at least one contingent instruction faults and produces a critical trap signal that causes the processor to invoke the critical execution signal handler; and
wherein the processor executes the logic instructions of the critical execution signal handler to cause the computerized device to perform the operation of:

processing the critical trap signal to avoid interference from the interruption to the critical code section.

25. The computerized device of claim 24 wherein the computerized device is configured according to a non-scalable processor architecture and wherein the critical code register is a segment register.

26. The computerized device of claim 24 wherein the computerized device is configured according to a scalable processor architecture and wherein the critical code register is an address space identification register.

* * * * *